United States Patent
Yasukawa et al.

(10) Patent No.: US 10,075,981 B2
(45) Date of Patent: Sep. 11, 2018

(54) RADIO COMMUNICATION TERMINAL, RADIO BASE STATION AND RADIO COMMUNICATION METHOD

(71) Applicant: NTT DOCOMO, INC., Tokyo (JP)

(72) Inventors: Shimpei Yasukawa, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 106 days.

(21) Appl. No.: 15/129,435

(22) PCT Filed: Mar. 13, 2015

(86) PCT No.: PCT/JP2015/057497
§ 371 (c)(1),
(2) Date: Sep. 27, 2016

(87) PCT Pub. No.: WO2015/146638
PCT Pub. Date: Oct. 1, 2015

(65) Prior Publication Data
US 2017/0118776 A1 Apr. 27, 2017

(30) Foreign Application Priority Data
Mar. 28, 2014 (JP) .................. 2014-069105

(51) Int. Cl.
*H04W 74/08* (2009.01)
*H04W 28/08* (2009.01)

(52) U.S. Cl.
CPC ....... *H04W 74/0833* (2013.01); *H04W 28/08* (2013.01); *H04W 74/0866* (2013.01)

(58) Field of Classification Search
CPC .................................. H04W 28/08
See application file for complete search history.

(56) References Cited

U.S. PATENT DOCUMENTS

2015/0057011 A1* 2/2015 Di Girolamo .... H04W 74/0808
455/454

FOREIGN PATENT DOCUMENTS

WO 2012/135998 A1 10/2012

OTHER PUBLICATIONS

International Search Report issued in PCT/P2015/057497, dated Apr. 21, 2015 (2 page).
Written Opinion of the International Searching Authority issued in PCT/JP2015/057497, dated Apr. 21, 2015 (4 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Office Action issued in the counterpart Japanese Patent Application No. 2014-069105, dated Apr. 24, 2018 (5 pages).

* cited by examiner

*Primary Examiner* — Kent Krueger
(74) *Attorney, Agent, or Firm* — Osha Liang LLP

(57) ABSTRACT

The present invention is designed to realize RACH traffic off-loading. A radio communication terminal communicates with a radio base station by using a carrier that is different from the connecting carrier and includes an unlicensed band, and has a transmission section that transmits a cross-carrier RACH in the carrier including the unlicensed band, and a receiving section that receive a random access response that is transmitted from the radio base station having received the cross-carrier RACH.

10 Claims, 11 Drawing Sheets

| CP | PREAMBLE | CP | CONTROL FIELD | CP | DATA FIELD | GT |

RADIO COMMUNICATION TERMINAL, RADIO BASE STATION AND RADIO COMMUNICATION METHOD

TECHNICAL FIELD

The present invention relates to a radio communication terminal, a radio base station and a radio communication method in a next-generation mobile communication system.

BACKGROUND ART

In the UMTS (Universal Mobile Telecommunications System) network, the specifications of long term evolution (LTE) have been drafted for the purposes of further increasing high-speed data rates, providing lower delays and so on (see non-patent literature 1). In LTE, as multiple-access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

A successor system of LTE is under study for the purpose of achieving further broadbandization and increased speed beyond LTE. This successor system of LTE is also referred to as, for example, "LTE-advanced" or "LTE enhancement" (hereinafter "LTE-A"). LTE-A systems of recent years have seen an increasing demand for communication terminals (MTCs: Machine Type Communication terminals) for small modules that involve no human-induced control. MTC terminals may be used in, for example, electric meters, gas meters, vending machines, vehicles, and other industrial instruments.

CITATION LIST

Non-Patent Literature

Non-Patent Literature 1: 3GPP TS 36. 300 "Evolved UTRA and Evolved UTRAN Overall Description"

SUMMARY OF THE INVENTION

Technical Problem

If, in the future, the number of MTC terminals increases, a network needs to support a large number of radio communication terminals in making connections. By this means, the problem arises that the number of RACH resources in random access, which radio communication terminals execute when the radio communication terminals establish connections with radio base stations to start communicating, and therefore the amount of uplink shared channel resources decreases.

Consequently, in order to implement the RACH in effect, new radio access technology is necessary.

The present invention has been made in view of the above, and it is therefore an object of the present invention to provide a radio communication terminal, a radio base station and a radio communication method that can realize RACH traffic off-loading.

Solution to Problem

The radio communication terminal of the present invention provides a radio communication terminal that communicates with a radio base station by using a carrier that is different from a connecting carrier and includes an unlicensed band, and this radio communication terminal has a transmission section that transmits a cross-carrier RACH in the carrier including the unlicensed band, and a receiving section that receive a random access response that is transmitted from the radio base station having received the cross-carrier RACH.

Technical Advantage of the Invention

According to the present invention, it is possible to realize RACH traffic off-loading.

DESCRIPTION OF EMBODIMENTS

Now, an embodiment of the present invention will be described below in detail with reference to the accompanying drawings. In the future, the number of MTC terminals increases, and a network needs to support a large number of terminals, including both HTC terminals and MTC terminals, in making connections. Here, an HTC terminal (HTC: Human Type Communication terminal) refers to a communication terminal, in which decisions pertaining to signal communication are made by human-induced control.

In comparison to HTC terminals, the packet size is small in MTC terminals, and, in turn, the proportion of overhead in each layer increases, relatively, and therefore a study is in progress to simplify this.

Random access (RA) is carried out when a radio communication terminal UE connects or re-synchronizes with a radio base station eNodeB (eNB) to start communicating and/or perform a handover. The radio communication terminal UE first transmits an RA preamble (preamble) when executing random access control such as when making an initial connection. channel for transmitting an RA preamble first in random access is referred to as the physical random access channel (PRACH: Physical Random Access Channel).

Random access can be divided into two types—the collision type and the non-collision type. The present invention will focus on collision-type random access for discussion. In collision-type random access, a radio communication terminal UE transmits a preamble, which is selected on a random basis from a plurality of RA preambles (contention preambles) prepared in the cell, in the PRACH. In this case, if the same RA preamble is used between radio communication terminals UE, a contention might occur.

Figure 1:
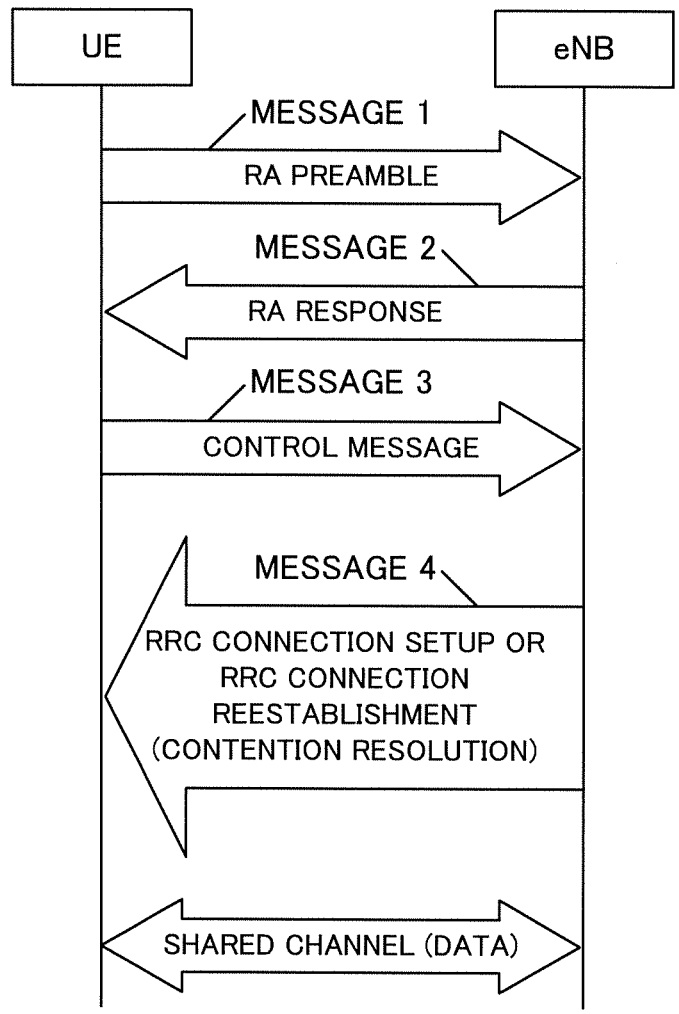
FIG. 1 is a diagram to explain collision-type random access procedures.

FIG. 1 is a diagram to show the procedures (steps) of collision-type random access. A radio communication terminal UE transmits, in the PRACH, a preamble that is selected on a random basis from random access (RA) preambles prepared in the cell, to a radio base station eNB, as a message 1. Upon detecting the random access (RA) preamble, the radio base station eNB transmits a random access (RA) response, which is response information thereto, to the radio communication terminal UE, as a message 2. Upon receiving the random access (RA) response, the radio communication terminal UE transmits a connection request signal (RRC (Radio Resource Control) connection request) to the radio base station eNB as a message 3. After having received message 3, the radio base station eNB transmits a connection setup signal (RRC connection setup), which includes cell configuration information and so on for establishing connections, to the radio communication terminal UE, as a message 4.

Figure 2:
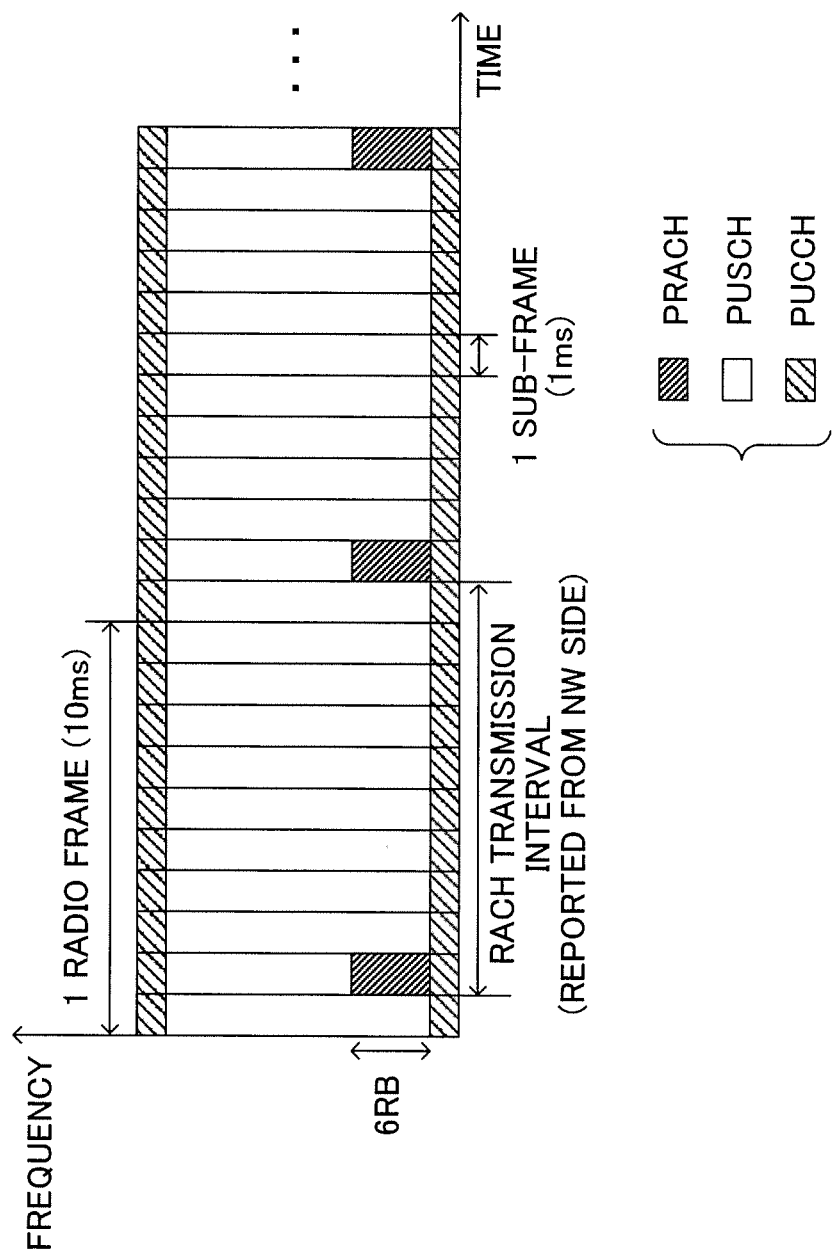
FIG. 2 is a diagram to show a configuration of RA preambles.

FIG. 2 shows the configuration of the random access (RA) preamble. As shown in FIG. 2, in the random access (RA) preamble, the PRACH is allocated as an uplink channel radio resource.

The PRACH uses 6 RBs of bandwidth. Information regarding the PRACH is reported in the form of broadcast information (SIB: System Information Block) or an RRC message. The locations of PRACH resources in the frequency direction are specified by PRACH frequency offsets. The locations of PRACH resources in the time direction are specified by PRACH configuration indices.

In the event of the RACH, preambles are transmitted in collision-type multiple access, so that it is difficult to reduce the information to transmit. Consequently, when the number of terminals increases and increased RACH transmissions follow this, no effective measure can be taken, except for increasing the amount of RACH resources.

Meanwhile, since the configuration regarding the amount of PRACH resources is reported in broadcast information, it is difficult to change this dynamically. Also, since an increase in the amount of RACH resources leads to a decrease in the amount of uplink shared channel (PUSCH: Physical Uplink Shared Channel) resources, a trade-off relationship holds between these.

Consequently, new radio access technology (RAT: Radio Access Technology) is necessary in order to implement the RACH in effect.

The present inventors have found out a method of implementing RACH off-loading by carrying out only the RACH transmission in random access procedures in a separate band such as an unlicensed band.

An unlicensed band refers to a frequency band that requires no license, as opposed to a frequency band that is licensed to a communications provider (operator). A licensed band is a band in which a specific operator is allowed exclusive use, and an unlicensed band is a band which is not limited to a specific operator and in which radio stations can be provided. For unlicensed bands, for example, the 2.4 GHz band and the 5 GHz band where Wi-Fi and Bluetooth (registered trademark) can be used, the 60 GHz band where millimeter-wave radars can be used, and so on are under study for use.

A cross-carrier RACH to perform only the RACH transmission in random access procedures in a separate band such as an unlicensed band will be described with the present embodiment.

Figures 3, 4:
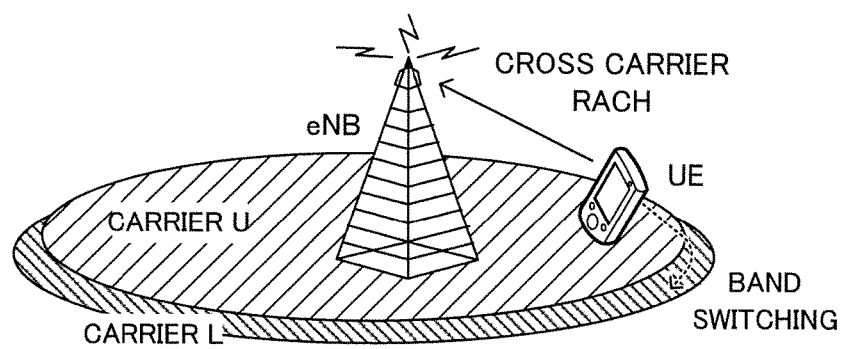
FIG. 3 is a diagram to explain the concept of a cross-carrier RACH.
FIG. 4 is a diagram to explain an example of a cross-carrier RACH frame configuration.

FIG. 3 is a diagram to explain the concept of a cross-carrier RACH. In FIG. 3, the carrier L represents the licensed band carrier, and the carrier U represents the unlicensed band carrier. Nevertheless, the carrier U does not necessarily have to be a carrier of an unlicensed band as long as the frequencies of the carrier L and the carrier U are different. Assume that the receivers for the carrier L and the carrier U are co-located in the radio base station eNB. Furthermore, assume that the carrier L and the carrier U are connected with an ideal backhaul.

The radio base station eNB reports the carrier U that can transmit the capability of the cross carrier RA and the cross-carrier RACH to the radio communication terminal UE through a broadcast channel on the carrier L or through higher layer signaling such as RRC (Radio Resource Control) signaling. The carrier U needs not be an LTE carrier, and there may be no downlink signal to transmit.

The radio communication terminal UE transmits the cross-carrier RACH in the carrier U based on the information reported from the radio base station eNB. Note that the cross-carrier RACH may be a RACH, a signal that resembles a RACH, a WiFi signal and so on. The radio communication terminal UE reports information about the carrier L with which the radio communication terminal UE wants to connect—that is, the cell ID, the band and so on—by using the cross-carrier RACH.

The radio base station eNB receives the cross-carrier RACH in the carrier U, and transmits a RACH response in the carrier L.

The subsequent random access procedures are all executed in the carrier L. Note that part or all of the random access procedures may be carried out in the carrier U.

The cross-carrier RACH may be the RACH stipulated in Rel. 8-12 LTE, or may be a RACH having a completely different configuration.

For example, as shown in FIG. 4, the frame configuration of the cross-carrier RACH may be comprised of one or any of a cyclic prefix (CP), a preamble, a control field, a data field, a guard time (GT) and a combination of these. Parameters that are necessary to receive the data field may be configured in advance in the radio communication terminal UE or in the radio base station eNB, or may be signaled in advance from the radio base station eNB to the radio communication terminal UE as the RACH configuration, so that the control field may be removed. In the data field, an arbitrary bit sequence can be transmitted.

For the frame configuration of the cross-carrier RACH, for example, the frame that is stipulated in IEEE 802.11 series may be used. To be more specific, for example, a management frame such as a probe request may be used. In this case, the preamble is different from that of LTE, so that the preamble index, which is required in random access procedures, may be reported in the data field. Also, instead of the preamble index, it is equally possible to report an arbitrary bit sequence in the field for reporting the SSID (Service Set IDentifier), the address and so on. In this case, this bit sequence may be returned in the random access response, instead of the preamble index.

In the frame configuration of the cross-carrier RACH, it may be possible to secure signal quality by repeating transmitting preambles, or the CP length may be made longer so that significant delays may be prevented.

When an unlicensed band is applied to the carrier U, it may be possible to identify the operator ID and the carrier ID of the connecting target, the LTE-U capability of the radio communication terminal UE and so on, by using the cross-carrier RACH. In the event the cross-carrier RACH contains a data field, the operator ID, the carrier ID, the LTE-U capability of the radio communication terminal UE and so on may be reported in the data field. Alternatively, these may be identified, implicitly, from the time, frequency or the sequence used for the cross-carrier RACH. The base station, having received the cross-carrier RACH, may decide, based on the LTE-U capability, whether to transmit message 2 in the unlicensed band or in the licensed band where the radio communication terminals UE is connected.

The configuration of the cross-carrier RACH—that is, the transmission resource, the transmission power control parameters, the sequence, the frame configuration and so on—is reported through higher layer signaling, including broadcast or RRC signaling of the carrier L or the carrier U.

Next, an example of random access procedures to use the cross-carrier RACH will be described.

Figure 5A:
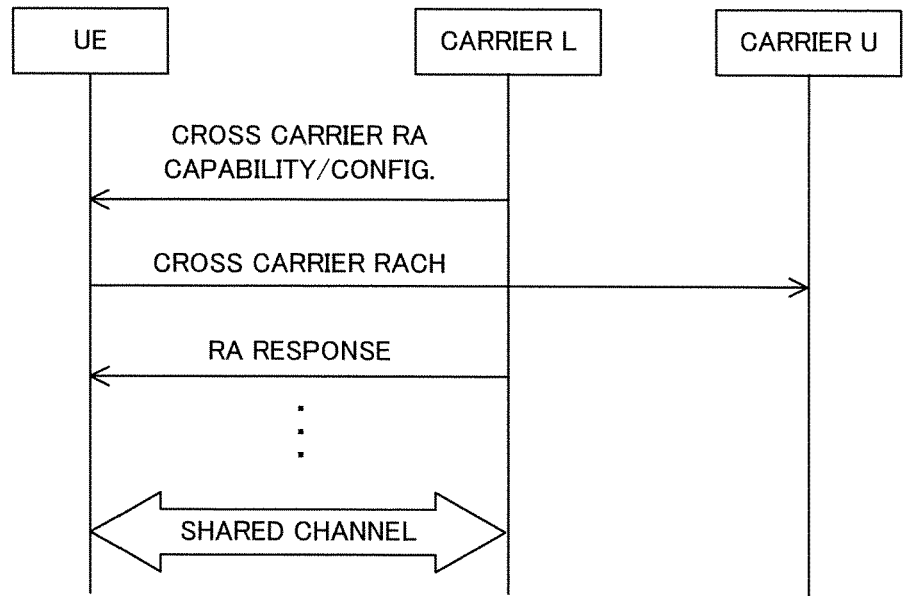
FIG. 5 provide diagrams to explain examples of random access procedures to use a cross-carrier RACH.
Figure 5B:
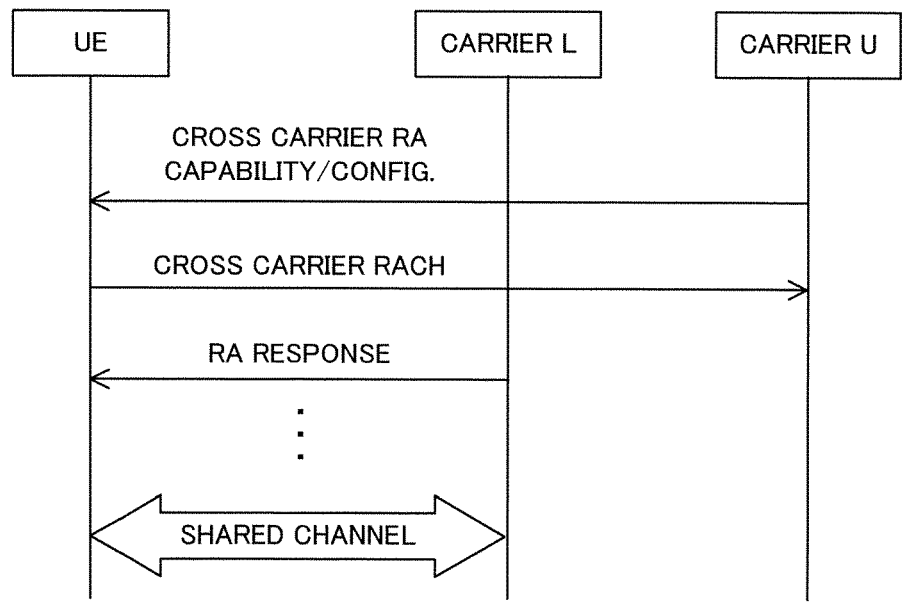

The capability and configuration of the cross-carrier RACH may be transmitted from the carrier L, or may be transmitted from the carrier U. In the example shown in FIG. 5A, the capability and configuration of the cross-carrier RACH are transmitted from the carrier L. In the example shown in FIG. 5B, the capability and configuration of the cross-carrier RACH are transmitted from the carrier U. In the examples illustrated in FIGS. 5A and 5B, the radio communication terminal UE, having received the capability and configuration of the cross-carrier RACH, transmits the cross-carrier RACH to the carrier U. The radio base station eNB receives the cross-carrier RACH in the carrier U, and transmits a random access response in the carrier L.

Figure 6A:
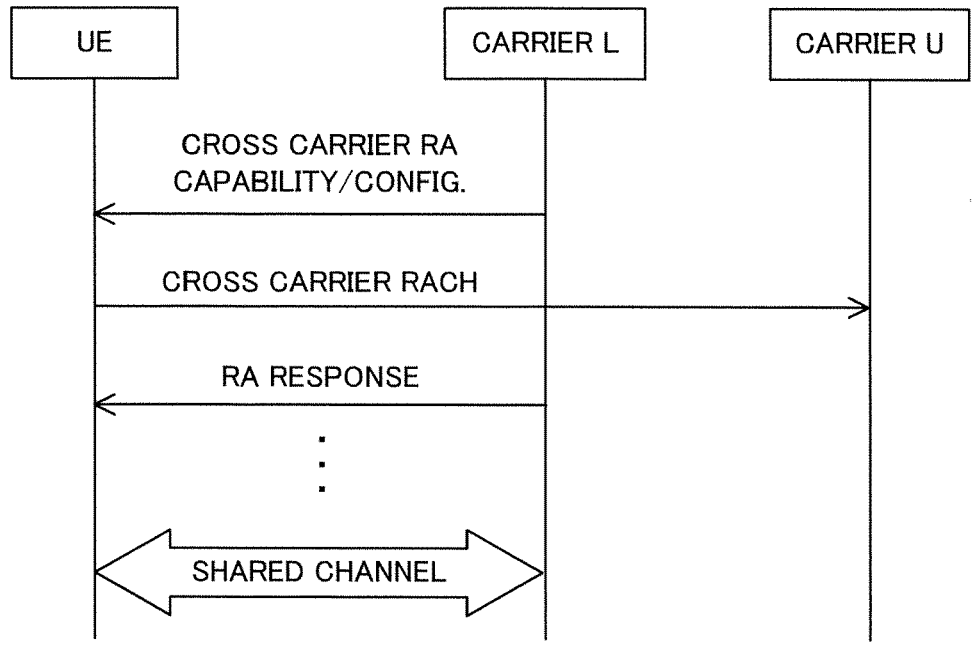
FIG. 6 provide diagrams to explain examples of random access procedures to use a cross-carrier RACH.
Figure 6B:
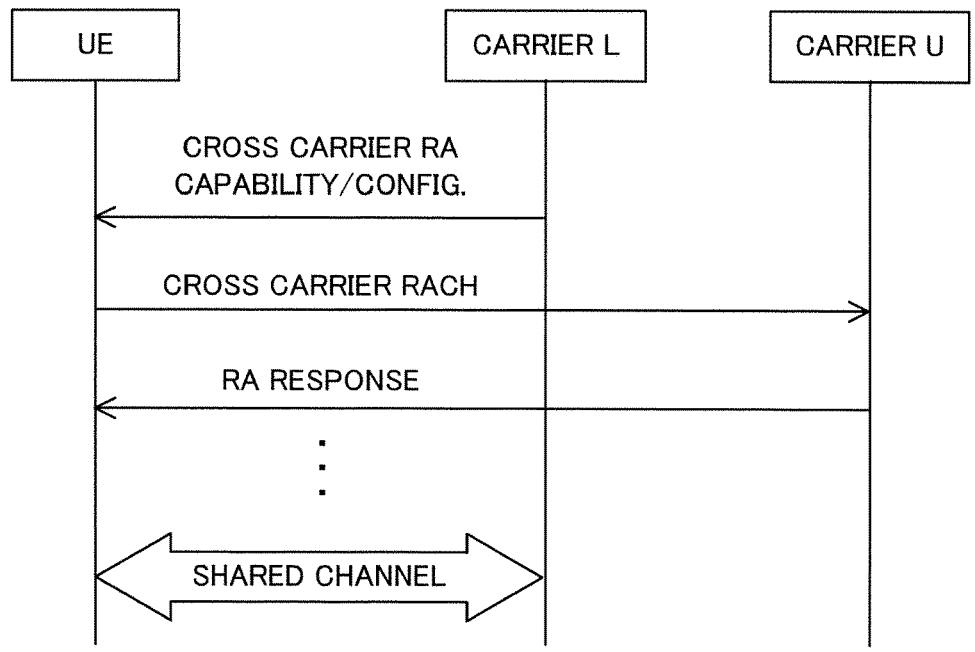

The random access response may be transmitted from the carrier L, or may be transmitted from the carrier U. In the example shown in FIG. 6A, the random access response is transmitted from the carrier L. In the example shown in FIG. 6B, the random access response is transmitted from the carrier U.

Note that the examples shown in FIG. 5 and FIG. 6 can be combined as appropriate. Although not illustrated, for example, a structure may be employed here in which the capability and configuration of the cross-carrier RACH are transmitted from the carrier U, and the random access response is transmitted from the carrier U.

Figure 7:
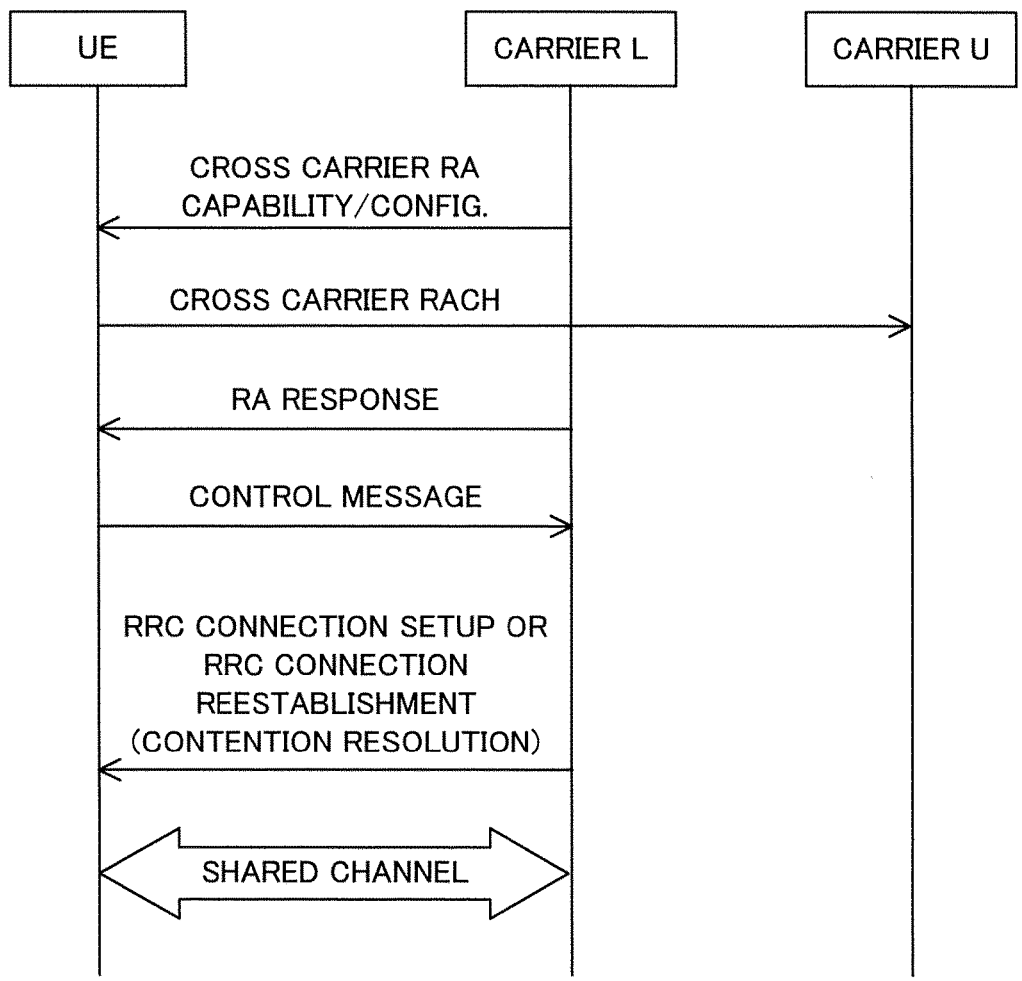
FIG. 7 is a diagram to explain an example of random access procedures to use a cross-carrier RACH.

As shown in FIG. 7, after the random access response, messages 3 and 4 may be transmitted and received as in collision-type random access procedures.

Referring to the example illustrated in FIG. 3, if the carrier L and the carrier U are connected via a non-ideal backhaul such as the X2 interface that produces delays that cannot be neglected, the cross-carrier RACH can be implemented in the following methods.

As a first method, it may be possible to carry out random access procedures to use the cross-carrier RACH with a delayed response. According to this method, a random access response is transmitted from the carrier L side. Then, after the cross-carrier RACH is transmitted, a time window for detecting the random access response is delayed more or made larger than the backhaul delay and the carrier switching time in the radio communication terminal UE. This setup of the window may be kept in record in the radio base station eNB and the radio communication UE, or may be reported in a broadcast signal of the carrier L or the carrier U.

As a second method, it may be possible to replace the collision-type RACH with a non-collision-type RACH by involving the carrier U. According to this method, after the cross-carrier RACH is transmitted to the carrier U and a TA (Timing Advance) command and the RACH sequence of the carrier L are received in a random access response, the non-collision-type RACH is transmitted to the carrier L.

Next, an example configuration of the random access response in the random access procedures to use the cross-carrier RACH will be described.

For the random access response, a downlink shared channel (PDSCH: Physical Downlink Shared Channel) may be used, or the frame stipulated in IEEE 802.11 series may be used.

In the random access response, at least a TA command, a C-RNTI (Cell-Radio Network Temporary Identifier), which is an identifier, an uplink scheduling grant, the index of the random access preamble that is received, or a combination of these pieces of information, is included. When the PDSCH is used for the random access response, these pieces of information are included in the MAC PDU (Media Access Control Packet Data Unit).

When an unlicensed band is applied to the carrier U, the likelihood of RACH contention is very low, so that the index information of the random access preamble that is received can be omitted.

When the random access response is transmitted in the unlicensed band, the uplink scheduling grant may be omitted. Instead of an uplink scheduling grant, a random access response ID may be reported. By reporting this random access response ID in message 3, the radio base station eNB can make sure the relationship between the random access response and message 3.

While the subframe to receive the random access response is supposed to come within X subframes after the cross-carrier RACH is transmitted, if the random access response is not received within X subframes, the radio communication terminal UE can decide that the cross carrier random access procedures have failed. Alternatively, the radio communication terminal UE may try transmitting the cross-carrier RACH up to the maximum number of tries.

The method of selecting the conventional RACH and the cross-carrier RACH will be described.

The radio communication terminal UE may transmit the cross-carrier RACH by using the carrier U only when carrier U downlink signals can be received. In this case, the RACH of the radio communication terminal UE in the center of the cell is off-loaded to the carrier U.

Also, it is equally possible to allow only radio communication terminals UE of a specific UE category or capability to carry out the random access procedures to use the cross-carrier RACH.

Alternatively, the radio communication terminal UE may operate to transmit the cross-carrier RACH only when the conventional RACH fails.

In cross-carrier RACH transmission power control, transmission power control to achieve the required received power based on the path loss of the carrier U may be used. In this case, the downlink is required for the carrier U.

Alternatively, transmission power control for the cross-carrier RACH may be transmission power control that is based on the path loss of the carrier L.

Alternatively, in cross-carrier RACH transmission power control, when an unlicensed band is applied to the carrier U, the radio communication terminal UE may determine the transmission power autonomously, or use the transmission power signaled from the radio base station eNB.

Alternatively, in cross-carrier RACH transmission power control, power ramping needs not be applied.

Assume that the timing to transmit the cross-carrier RACH is the timing where a downlink signal is received in the carrier L, or the timing a downlink signal is received in the carrier U. When an unlicensed band is applied to the carrier U, the radio communication terminal UE transmits the cross-carrier RACH after carrier sensing.

If, after having transmitted the cross-carrier RACH in the carrier U, the radio communication terminal UE cannot receive a random access response, the radio communication terminal UE may transmit the RACH using another carrier, which may be the carrier L, or by using a different carrier.

As described above, by transmitting the cross-carrier RACH to the capacity band and implementing timing advance with respect to the coverage band, RACH traffic off-loading can be realized. In particular, it is possible to reduce the likelihood of RACH contention with the collision-type RACH.

In particular, when an unlicensed band is used, it is possible to take advantage of the affinity between orthogonal multiple access in the unlicensed band and the collision-type RACH in random access. Time/frequency resources are reserved substantially for exclusive use in random access, so that, despite the trade-off relationship that holds between the RACH capacity and the PUSCH capacity, all resources can be used for random access in the unlicensed band.

Differences between the cross-carrier RACH and the RACH in handover will be described.

In the RACH in handover, a radio communication terminal UE is in RRC-connected mode with the serving cell, and transmits the non-collision-type RACH in accordance with the RACH configuration information (RACH config.) of the handover-source radio base station (source eNB). The RACH is received on the handover-destination radio base station (destination eNB) side, and a random access response is transmitted from the handover-source radio base station.

By contrast with this, cases might occur, with the cross-carrier RACH, where the radio communication terminal UE is in initial connection. The RACH configuration is reported from the RACH transmission destination (carrier U) or the connecting target (carrier L). In the event of initial connection, the RACH is the collision-type RACH. The RACH, which the radio communication terminal UE transmits, may have a different signal format and frame configuration from the RACH stipulated in Rel. 8-12 LTE. The random access response is reported from either the RACH transmission destination (carrier U) or the connecting target (carrier L).

In this way, the cross-carrier RACH and the RACH in handover are similar in that these RACHs are transmitted in response to triggers from different cells, but are completely different methods otherwise.

(Structure of Radio Communication System)

Now, a structure of a radio communication system according to the present embodiment will be described below. In this radio communication system, the above-described radio communication method to execute random access by using the cross-carrier RACH is employed.

Figure 8:
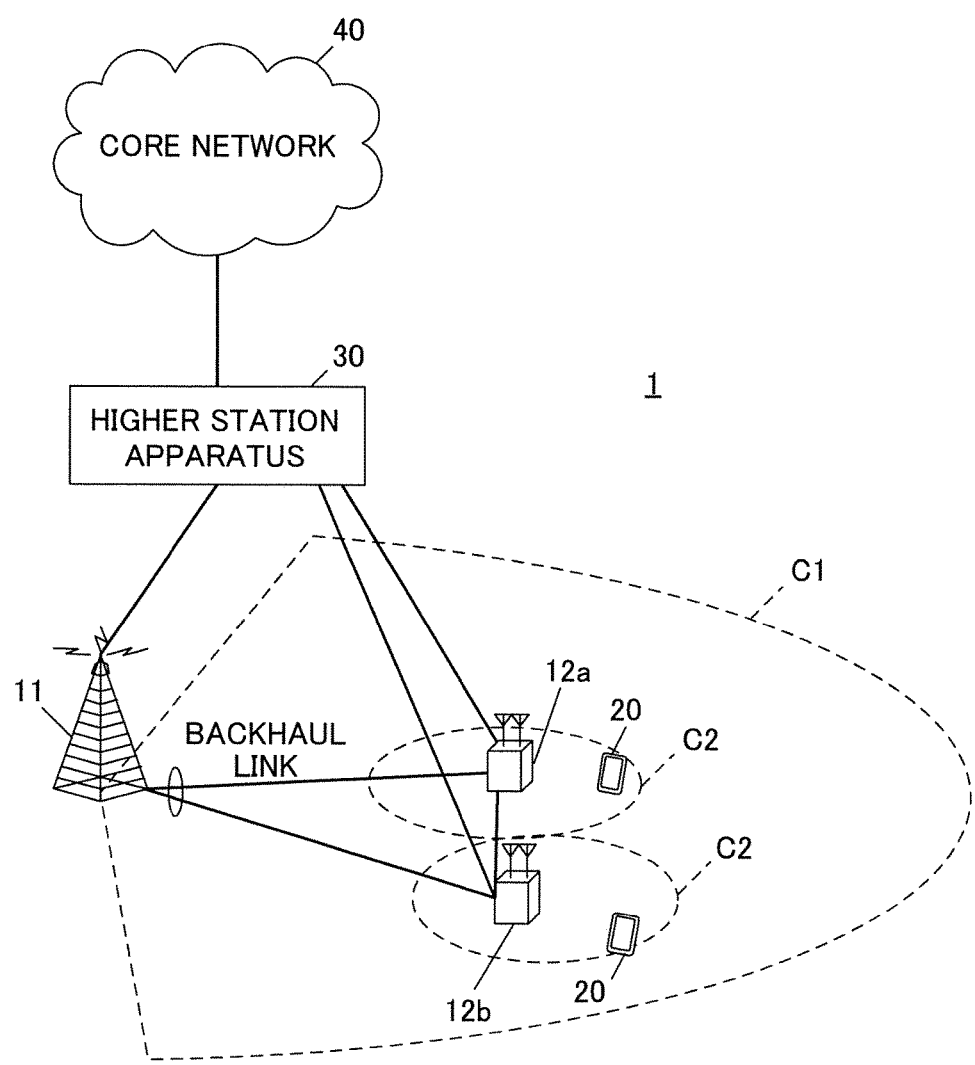
FIG. 8 is a schematic diagram to show an example of a radio communication system according to the present embodiment.

FIG. 8 is a schematic structure diagram to show an example of a radio communication system according to the present embodiment. The radio communication system shown in FIG. 8 includes an unlicensed band (LTE-U base station).

As shown in FIG. 8, a radio communication system 1 includes a radio base station 11 that forms a macro cell C1, and radio base stations 12a and 12b that form small cells C2, which are placed inside the macro cell C1 and which are narrower than the macro cell C1.

In the radio communication system 1, for example, a mode of use may be possible in which the macro cell C1 use a licensed band and the small cells C2 use an unlicensed band (LTE-U). Alternatively, a mode of use may also be possible in which the radio base station 11 uses a licensed band and an unlicensed band. In this case, the licensed band cell and the unlicensed band cell which the radio base station 11 forms may have different sizes.

The user terminals 20 can connect with both the radio base station 11 and the radio base stations 12. Between the user terminals 20 and the radio base station 11, communication is carried out using a carrier of a relatively low frequency band (for example, 2 GHz) and a narrow bandwidth (referred to as, for example, "existing carrier," "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Between the radio base station 11 and the radio base stations 12, or between the radio base stations 12, wire connection (optical fiber, the X2 interface and so on) or wireless connection is established.

The radio base station 11 and the radio base stations 12 are each connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, the radio base stations 12 may be connected with the higher station apparatus 30 via the radio base station 11.

The radio base station 11 is a radio base station having a relatively wide coverage, and may be referred to as an "eNodeB" (eNB), a "radio base station," a "transmission point" and so on. The radio base stations 12 are radio base stations having local coverages, and may be referred to as "RRHs" (Remote Radio Heads), "pico base stations," "femto base stations," "HeNBs" (Home eNodeBs), "transmission points," "eNodeBs" (eNBs), and so on. The user terminals 20 are terminals to support various communication schemes such as LTE, LTE-A and so on, and may be either mobile communication terminals or stationary communication terminals.

The radio communication system 1 presumes the case where the networks that are formed per macro cell are asynchronous (asynchronous operation). Also, in the radio communication system 1, as radio access schemes, OFDMA (Orthogonal Frequency Division Multiple Access) is applied to the downlink, and SC-FDMA (Single-Carrier Frequency Division Multiple Access) is applied to the uplink.

In the radio communication system 1, a downlink shared channel (PDSCH: Physical Downlink Shared Channel), which is used by each user terminal 20 on a shared basis, a downlink control channel (PDCCH: Physical Downlink Control Channel), an EPDCCH (Enhanced Physical Downlink Control Channel), a PCFICH (Physical Control Format Indicator Channel), a PHICH (Physical Hybrid-ARQ Indicator Channel), a broadcast channel (PBCH: Physical Broadcast Channel) and so on are used as downlink communication channels. User data and higher layer control information are communicated by the PDSCH. Downlink control information (DCI) is communicated using the PDCCH and the EPDCCH.

Also, in the radio communication system 1, an uplink shared channel (PUSCH: Physical Uplink Shared Channel), which is used by each user terminal 20 on a shared basis, an uplink control channel (PUCCH: Physical Uplink Control Channel) and so on are used as uplink communication channels. User data and higher layer control information are communicated by the PUSCH. Also, downlink radio quality information (CQI: Channel Quality Indicator), delivery acknowledgment information (ACK/NACK) and so on are communicated by the PUCCH.

Figure 9:
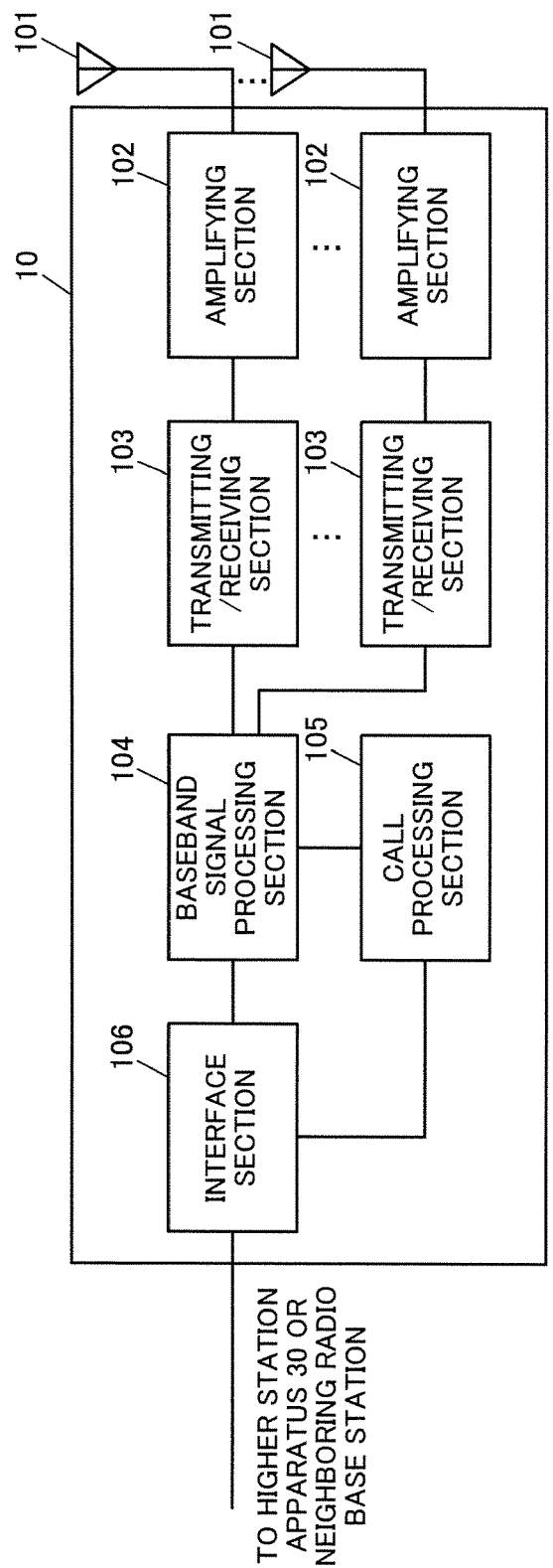
FIG. 9 is a diagram to explain an overall structure of a radio base station according to the present embodiment.

FIG. 9 is a diagram to shown an overall structure of a radio base station 10 according to the present embodiment. As shown in FIG. 9, the radio base station 10 has a plurality of transmitting/receiving antennas 101 for MIMO communication, amplifying sections 102, transmitting/receiving sections 103, a baseband signal processing section 104, a call processing section 105 and an interface section 106.

User data to be transmitted from the radio base station 10 to a user terminal 20 on the downlink is input from the higher station apparatus 30, into the baseband signal processing section 104, via the interface section 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts the downlink signals, pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101.

Each transmitting/receiving section 103 functions as a receiving section to receive the cross-carrier RACH, which a user terminal 20 transmits in the carrier U. Each transmitting/receiving section 103 functions as a transmission section to transmit a random access response in the carrier L or the carrier U. Also, each transmitting/receiving section 103 functions as a transmission section that transmits information about the capability of random access to use the cross-carrier RACH and the unlicensed band which can transmit the cross-carrier RACH, by using the carrier L or the carrier U.

On the other hand, as for uplink signals, radio frequency signals that are received in the transmitting/receiving antennas 101 are each amplified in the amplifying sections 102, converted into the baseband signal through frequency conversion in each transmitting/receiving section 103, and input into the baseband signal processing section 104.

In the baseband signal processing section 104, the user data that is included in the input uplink signals is subjected to an FFT process, an IDFT process, error correction decoding, a MAC retransmission control receiving process and RLC layer and PDCP layer receiving processes, and the result is forwarded to the higher station apparatus 30 via the interface section 106. The call processing section 105 performs call processing such as setting up and releasing communication channels, manages the state of the radio base station 10 and manages the radio resources.

The interface section 106 transmits and receives signals to and from neighboring radio base stations (backhaul signaling) via an inter-base station interface (for example, optical fiber, the X2 interface, etc.). Alternatively, the interface section 106 transmits and receives signals to and from the higher station apparatus 30 via a predetermined interface.

Figure 10:
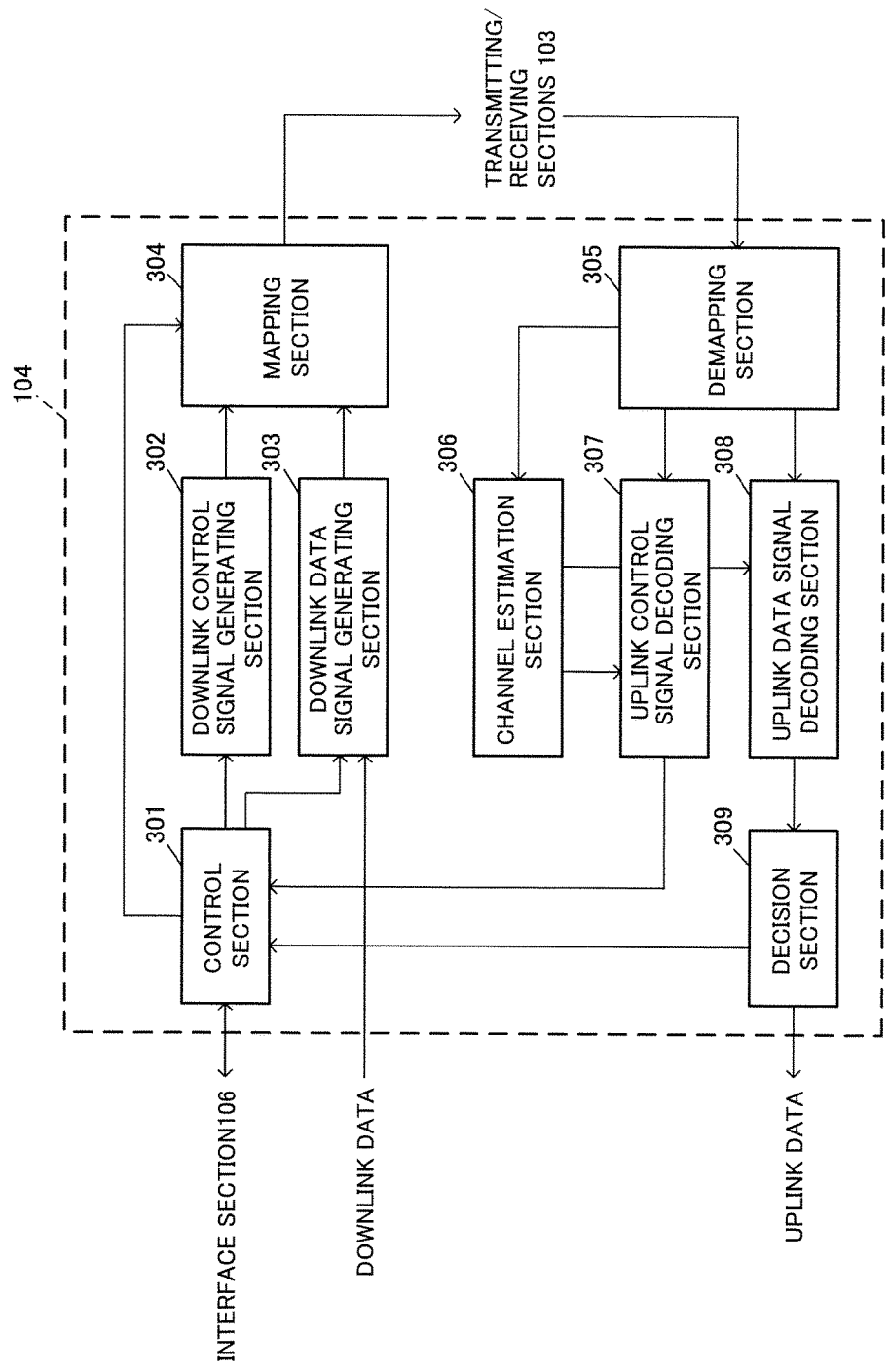
FIG. 10 is a diagram to explain a functional structure of a radio base station according to the present embodiment.

FIG. 10 is a diagram to show a principle functional structure of the baseband signal processing section 104 provided in the radio base station 10 according to the present embodiment. As shown in FIG. 10, the baseband signal processing section 104 provided in the radio base station 10 is comprised at least of a control section 301, a downlink control signal generating section 302, a downlink data signal generating section 303, a mapping section 304, a demapping section 305, a channel estimation section 306, an uplink control signal decoding section 307, an uplink data signal decoding section 308 and a decision section 309.

The control section 301 controls the scheduling of downlink user data that is transmitted in the PDSCH, downlink control information that is transmitted in one or both of the PDCCH and the enhanced PDCCH (EPDCCH), downlink reference signals and so on. Furthermore, the control section 301 also controls the scheduling of RA preambles transmitted in the PRACH, uplink data that is transmitted in the PUSCH, uplink control information that is transmitted in the PUCCH or the PUSCH, and uplink reference signals (allocation control). Information about the allocation control of uplink signals (uplink control signals, uplink user data, etc.) is reported to the user terminal 20 by using a downlink control signal (DCI).

The control section 301 controls the allocation of radio resources to downlink signals and uplink signals based on command information from the higher station apparatus 30, feedback information from each user terminal 20 and so on. That is, the control section 301 functions as a scheduler.

The downlink control signal generating section 302 generates downlink control signals (which may be both PDCCH signals and EPDCCH signals, or may be one of these) that are determined to be allocated by the control section 301. To be more specific, the downlink control signal generating section 302 generates a DL assignment, which reports downlink signal allocation information, and a UL grant, which reports uplink signal allocation information, based on commands from the control section 301.

The downlink data signal generating section 303 generates downlink data signals (PDSCH signals) that are determined to be allocated to resources by the control section 301. The data signals that are generated in the downlink data signal generating section 303 are subjected to a coding process and a modulation process, based on coding rates and modulation schemes that are determined based on CSI from each user terminal 20 and so on.

The mapping section 304 controls the allocation of the downlink control signals generated in the downlink control signal generating section 302 and the downlink data signals generated in the downlink data signal generating section 303 to radio resources based on commands from the control section 301.

The demapping section 305 demaps an uplink signal transmitted from the user terminal 20 and separates the uplink signal. The channel estimation section 306 estimates channel states from the reference signals included in the received signals separated in the demapping section 305, and outputs the estimated channel states to the uplink control signal decoding section 307 and the uplink data signal decoding section 308.

The uplink control signal decoding section 307 decodes the feedback signals (delivery acknowledgement signals and/or the like) transmitted from the user terminal in the uplink control channel (PRACH, PUCCH, etc.), and outputs the results to the control section 301. The uplink data signal decoding section 308 decodes the uplink data signals transmitted from the user terminals through an uplink shared channel (PUSCH), and outputs the results to the decision section 309. The decision section 309 makes retransmission control decisions (A/N decisions) based on the decoding results in the uplink data signal decoding section 308, and outputs the results to the control section 301.

Figure 11:
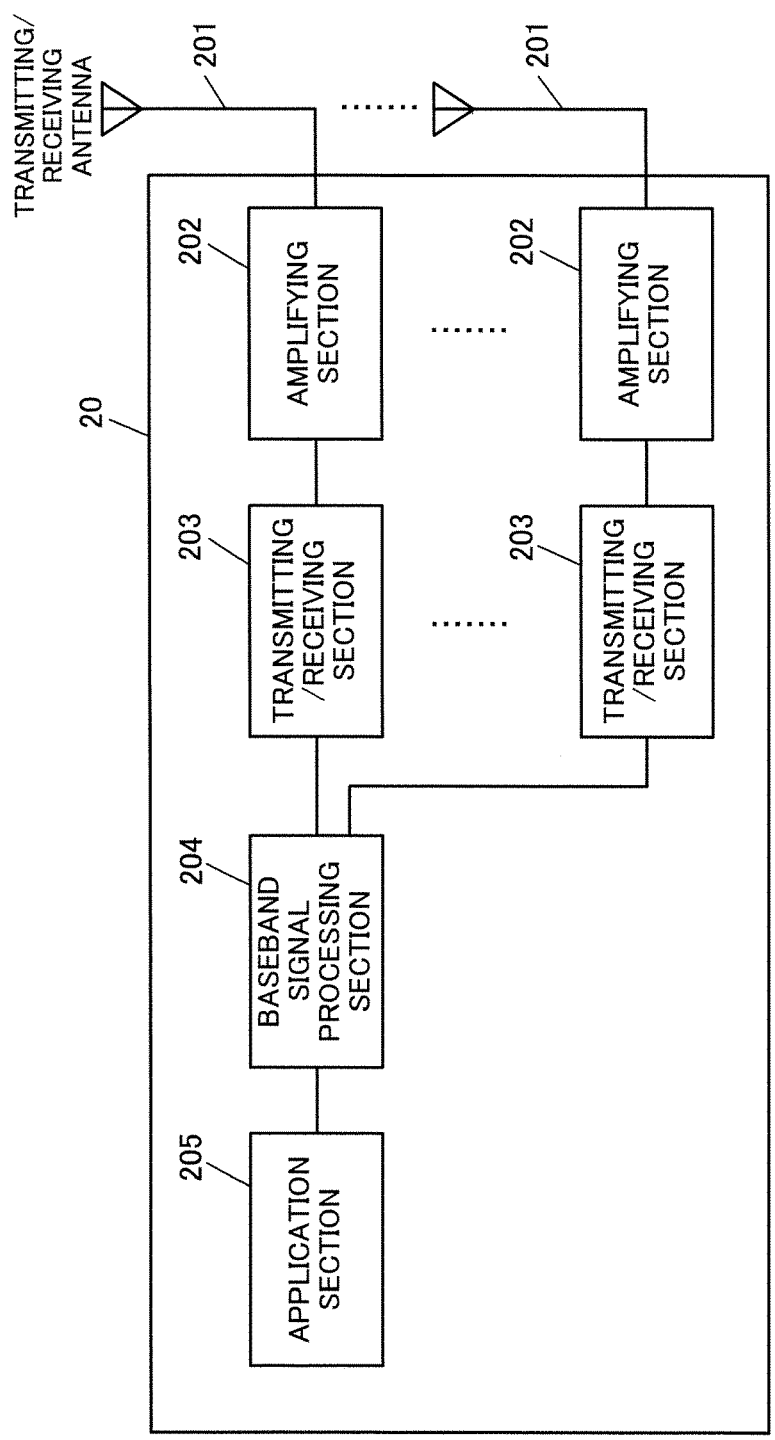
FIG. 11 is a diagram to explain an overall structure of a radio communication terminal according to the present embodiment.

FIG. 11 is a diagram to show an overall structure of a user terminal 20 according to the present embodiment—that is, an MTC terminal or an HTC terminal. As shown in FIG. 11, the user terminal 20 has a plurality of transmitting/receiving antennas 201 for MIMO communication, amplifying sections 202, transmitting/receiving sections (receiving sections) 203, a baseband signal processing section 204 and an application section 205. Although FIG. 11 shows a plurality of transmitting/receiving antennas 201, it is still possible to provide only one transmitting/receiving antenna 201 in the user terminal 20.

As for downlink data, radio frequency signals that are received in the plurality of transmitting/receiving antennas 201 are each amplified in the amplifying sections 202, and subjected to frequency conversion and converted into the baseband signal in the transmitting/receiving sections 203. This baseband signal is subjected to an FFT process, error correction decoding, a retransmission control receiving process and so on in the baseband signal processing section 204. In this downlink data, downlink user data is forwarded to the application section 205. The application section 205 performs processes related to higher layers above the physical layer and the MAC layer, and so on. Furthermore, in the downlink data, broadcast information is also transferred to the application section 205.

Meanwhile, uplink user data is input from the application section 205 to the baseband signal processing section 204. In the baseband signal processing section 204, a retransmission control (HARQ: Hybrid ARQ) transmission process, channel coding, precoding, a DFT process, an IFFT process and so on are performed, and the result is forwarded to each transmitting/receiving section 203. The baseband signal that is output from the baseband signal processing section 204 is converted into a radio frequency band in the transmitting/receiving sections 203. After that, the amplifying sections 202 amplify the radio frequency signals having been subjected to frequency conversion, and transmit the resulting signals from the transmitting/receiving antennas 201.

Each transmitting/receiving section 203 functions as a transmission section to transmit the cross-carrier RACH in the carrier U. Each transmitting/receiving section 203 functions as a receiving section to receive the random access response transmitted from the radio base station 10 in the carrier L or the carrier U.

Figure 12:
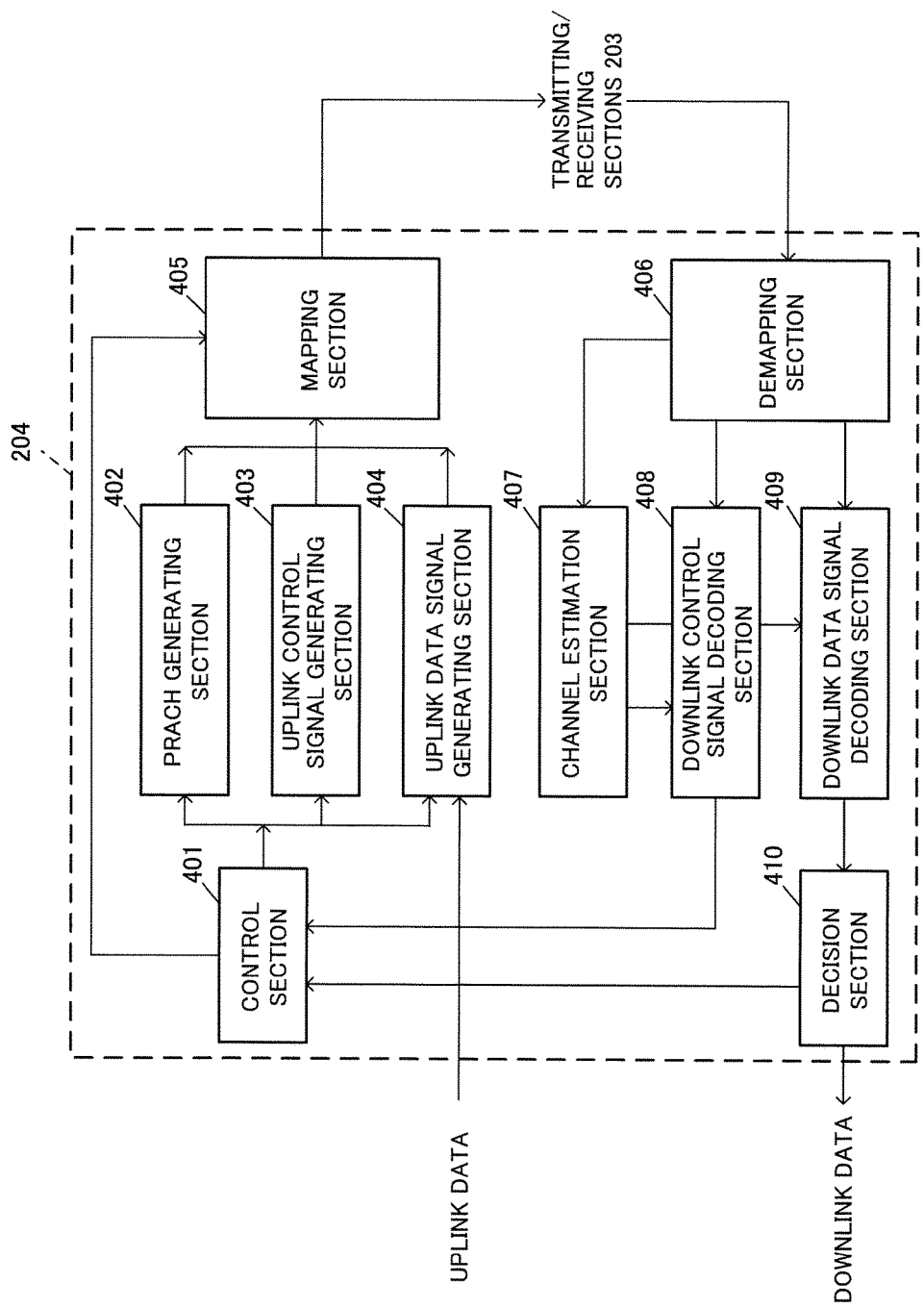
FIG. 12 is a diagram to explain a functional structure of a radio communication terminal according to the present embodiment.

FIG. 12 is a diagram to show a principle functional structure of the baseband signal processing section 204 provided in the user terminal 20. As shown in FIG. 12, the baseband signal processing section 204 provided in the user terminal 20 is comprised at least of a control section 401, a PRACH generating section 402, an uplink control signal generating section 403, an uplink data signal generating section 404, a mapping section 405, a demapping section 406, a channel estimation section 407, a downlink control signal decoding section 408, a downlink data signal decoding section 409 and a decision section 410.

The control section 401 controls the generation of uplink control signals (A/N signals and so on) and uplink data signals based on the downlink control signals (PDCCH signals) transmitted from the radio base stations, retransmission control decisions with respect to the PDSCH signals received, and so on. The downlink control signals received from the radio base stations are output from the downlink control signal decoding section 408, and the retransmission control decisions are output from the decision section 410.

The PRACH generating section 402 generates the PRACH based on commands from the control section 401. The uplink control signal generating section 403 generates uplink control signals (feedback signals such as delivery acknowledgement signals, channel state information (CSI) and so on) based on commands from the control section 401. The uplink data signal generating section 404 generates uplink data signals based on commands from the control section 401. Note that, when a UL grant is contained in a downlink control signal reported from the radio base stations, the control section 401 commands the uplink data signal 404 to generate an uplink data signal.

The mapping section 405 controls the allocation of the PRACH, the uplink control signals (delivery acknowledgment signals and so on) and the uplink data signals to radio resources (PUCCH, PUSCH, etc.) based on commands from the control section 401.

The demapping section 406 demaps downlink signals transmitted from the radio base stations 10 and separates the downlink signals. The channel estimation section 407 estimates channel states from the reference signals included in the received signals separated in the demapping section 406, and outputs the estimated channel states to the downlink control signal decoding section 408 and the downlink data signal decoding section 409.

The downlink control signal decoding section 408 decodes the downlink control signal (PDCCH signal) transmitted in the downlink control channel (PDCCH), and outputs the scheduling information (information regarding the allocation to uplink resources) to the control section 401. Also, when information related to the cell to feedback delivery acknowledgement signals or information as to whether or not to apply RF tuning is included in a downlink control signal, these pieces of information are also output to the control section 401.

The downlink data signal decoding section 409 decodes the downlink data signals transmitted in the downlink shared channel (PDSCH), and outputs the results to the decision section 410. The decision section 410 makes retransmission control decisions (A/N decision) based on the decoding results in the downlink data signal decoding section 409, and outputs the results to the control section 401.

The present invention is by no means limited to the above embodiment and can be implemented in various modifications. The sizes and shapes illustrated in the accompanying drawings in relationship to the above embodiment are by no means limiting, and may be changed as appropriate within the scope of optimizing the effects of the present invention. Besides, implementations with various appropriate changes may be possible without departing from the scope of the object of the present invention.

The disclosure of Japanese Patent Application No. 2014-069105, filed on Mar. 28, 2014, including the specification, drawings and abstract, is incorporated herein by reference in its entirety.

The invention claimed is:

1. A radio communication terminal that communicates with a radio base station by using a carrier that is different from a connecting carrier and includes an unlicensed band, the radio communication terminal comprising:
   a transmitter that transmits a cross-carrier RACH in the carrier including the unlicensed band; and
   a receiver that receives a random access response that is transmitted from the radio base station having received the cross-carrier RACH,
   wherein after the random access response is received, the radio communication terminal carries out a connection request procedure in a licensed band carrier which is the connecting carrier, and establishes a connection with the radio base station using the licensed band carrier.

2. The radio communication terminal according to claim 1, wherein the cross-carrier RACH is a signal that is formed with at least one of a cyclic prefix, a preamble, a control field, a data field and a guard time.

3. The radio communication terminal according to claim 1, wherein the cross-carrier RACH has a frame configuration that is stipulated in IEEE 802.11 series.

4. The radio communication terminal according to claim 1, wherein, before the cross-carrier RACH is transmitted, the receiver receives information about capability of random access using the cross-carrier RACH and an unlicensed band where the cross-carrier RACH is transmitted.

5. The radio communication terminal according to claim 4, wherein the information about the capability of random access using the cross-carrier RACH and the unlicensed band where the cross-carrier RACH is transmitted, is transmitted on a carrier of a licensed band.

6. The radio communication terminal according to claim 4, wherein the information about the capability of random access using the cross-carrier RACH and the unlicensed band where the cross-carrier RACH is transmitted, is transmitted on the carrier including the unlicensed band.

7. The radio communication terminal according to claim 1, wherein the random access response is transmitted on the carrier of the licensed band.

8. The radio communication terminal according to claim 1, wherein the random access response is transmitted on the carrier including the unlicensed band.

9. A radio base station that communicates with a radio communication terminal by using an unlicensed band, the radio base station comprising:
   a receiver that receives a cross-carrier RACH, which the radio communication terminal transmits on a carrier that is different from a carrier where the radio communication terminal connects with, and includes an unlicensed band; and
   a transmitter that, after the cross-carrier RACH is received, transmits the random access response on the carrier of the licensed band,
   wherein after the random access response is transmitted, the radio communication terminal carries out a connection request procedure in a licensed band carrier which is the connecting carrier, and establishes a connection with the radio base station using the licensed band.

10. A radio communication method for a radio communication terminal that communicates with a radio base station by using a carrier that is different from a connecting carrier and includes an unlicensed band, the radio communication method comprising the steps of:
   transmitting a cross-carrier RACH in the carrier including the unlicensed band; and
   receiving a random access response that is transmitted from the radio base station having received the cross-carrier RACH,
   wherein after the random access response is received, the radio communication terminal carries out a connection request procedure in a licensed band carrier which is the connecting carrier, and establishes a connection with the radio base station using the licensed band carrier.

* * * * *